United States Patent
Burnette et al.

(10) Patent No.: US 7,032,312 B2
(45) Date of Patent: Apr. 25, 2006

(54) CATALYTIC CONVERTER AND METHOD FOR MANUFACTURE THEREOF

(75) Inventors: Stephen L. Burnette, Chelsea, MI (US); Larry E. Strunk, Grass Lake, MI (US)

(73) Assignee: Calsonickansei North America, Inc., Farmington Hill, MI (US)

( * ) Notice: Subject to any disclaimer, the term of this patent is extended or adjusted under 35 U.S.C. 154(b) by 589 days.

(21) Appl. No.: 10/196,972

(22) Filed: Jul. 16, 2002

(65) Prior Publication Data

US 2004/0013581 A1    Jan. 22, 2004

(51) Int. Cl.
*B21D 51/16* (2006.01)
*B21D 39/00* (2006.01)

(52) U.S. Cl. ............... 29/890; 29/509; 422/179; 422/177; 422/180

(58) Field of Classification Search ............... 29/890, 29/509; 422/179, 177, 180; 219/121.69, 219/121.82
See application file for complete search history.

(56) References Cited

U.S. PATENT DOCUMENTS

| | | | |
|---|---|---|---|
| 3,301,992 A * | 1/1967 | Seeloff | 219/105 |
| 3,798,006 A * | 3/1974 | Balluff | 422/179 |
| 5,616,261 A | 4/1997 | Forrest | |
| 5,624,585 A | 4/1997 | Haruta et al. | |
| 5,814,784 A | 9/1998 | Kinsman et al. | |
| 5,925,268 A | 7/1999 | Britnell | 26/4 |
| 5,932,121 A | 8/1999 | Manabe et al. | 9/8 |
| 5,961,858 A | 10/1999 | Britnell | 26/2 |
| 6,111,214 A | 8/2000 | Saito | |
| 6,204,469 B1 | 3/2001 | Fields, Jr. et al. | |
| 6,258,328 B1 | 7/2001 | Torkkell et al. | 53/94 |
| 6,261,701 B1 | 7/2001 | Fields, Jr. | |
| 6,324,758 B1 * | 12/2001 | Huang et al. | 29/890 |
| 6,334,981 B1 * | 1/2002 | Wieres | 422/177 |
| 2003/0086832 A1 * | 5/2003 | Turek | 422/179 |
| 2003/0173344 A1 * | 9/2003 | Hermann | 219/121.64 |

* cited by examiner

*Primary Examiner*—Marc Jimenez (57) ABSTRACT

A system and method for the manufacture of a laser-welded cone-shell catalytic converter (100) is provided. An unformed shell blank (111) is formed into a cylindroid shell (110) having overlapping edges (112), which are then resistance welded to produce a shell seam (116). The shell seam (116) is planished to a thickness (120) less than 125 percent of a thickness (119) of the unformed shell blank (111). A ceramic catalytic substrate (130) is wrapped in a ceramic-fiber mounting mat (131) and inserted into the shell (110). Ends (125) of the shell (110) are crimped to form a 1 mm turndown (134). A pair of endcones (140) is assembled, where for each endcone (140) an outer cone (141) is loaded with an endcone insulation (142), and an inner cone (143) is pressed into and spot-welded to the outer cone (141). The endcones (140) are fitted to the shell (110) so as to form an overlap zone (151). The endcones (140) and shell (110) are then laser welded by an Nd:YAG laser (253) in the overlap zone (151).

13 Claims, 7 Drawing Sheets

CATALYTIC CONVERTER AND METHOD FOR MANUFACTURE THEREOF

TECHNICAL FIELD OF THE INVENTION

The present invention relates to the field of catalytic converters. More specifically, the present invention relates to the field of the manufacture of catalytic converters using laser welding.

BACKGROUND OF THE INVENTION

The automotive and light truck industries depend heavily upon catalytic converters to control exhaust emissions. These catalytic converters typically utilize ceramic substrates in the form of honeycombs coated with platinum and/or palladium to catalyze hydrocarbons, carbon monoxide, and nitrogen oxides in the exhaust into carbon dioxide, nitrogen, oxygen, and water.

During manufacture, it is important that the catalytic converters be gas tight. That is, that the converters, when coupled into an exhaust system, do not leak. If a converter leaks, then the noxious gasses the converter is intended to catalyze may pass directly into the atmosphere, thereby defeating the purpose of the converter.

A leaky converter may also pass air into the converter. Exhaust systems run hot. Therefore, the passage of much cooler air into the converter may cause fracturing and other damage to the ceramic substrate. This damage may reduce the converter efficiency, and may ultimately lead to converter failure.

Various techniques are used to assure that a converter is gas tight. Among these techniques are rolled seams and metal inert gas (MIG) welding. Both rolled seams and MIG welding pose problems during manufacture.

Rolled seams are typically used where workpiece edges are readily available. One such place is in the manufacture of a shell to contain the ceramic substrate. When the shell is formed into a cylindroid shape, the edges may be rolled together and flattened to form a gas-tight seam. Once formed, the seam is often spot-welded to inhibit unrolling due to thermal expansion and contraction, thereby maintaining the necessary gas-tight status.

A disadvantage of a rolled seam is that the seam is necessarily thick. This produces a discontinuity in the shell that inhibits the proper joining of other components.

Where edges are not readily accessible, as during final assembly, MIG welding is often used. MIG welding is a modified form of arc welding. In MIG welding, direct current is passed though a welding torch having a continuous metal wire as the welding element. An arc is generated, which melts the wire and the metal workpiece. This produces a molten pool, which creates the weld.

Gas is fed to the torch during the welding process. This gas acts as a fluxing agent. The use of gas as a fluxing agent inhibits oxidization of the weld and surrounding metal. The use of gas also eliminates the production of a flux residue.

MIG welding is often used in the welding of thin sheet metals, such as mild steel, stainless steel, and aluminum. Thus, MIG welding is common in the automotive and light truck industries, where extensive use is made of various sheet metals.

MIG welding is a filling process, i.e., the arc cuts a groove which is filled with molten metal from the wire and the surrounding workpiece. MIG welding is therefore suitable for the butt-welding of thin materials. Such butt welds are prone to minor defects of the weld (the bead). From the point of view of strength, these minor defects tend to be negligible. From the point of view of gas tightness, however, these minor defects may produce leaks over time. This is especially so where the welded object is subject to repetitive radical thermal differentials. This is exactly the case with catalytic converters. MIG welding, though common, may develop leaks and severely limit the overall life of a catalytic converter.

Laser welding has been attempted with mixed success. While an effective welding technique, laser welding has resulted in poor quality control because of excessive penetration (i.e., piercing). Piercing often results in seals that are not gas tight, or in weak gas-tight seals leading to early failure during operation.

SUMMARY OF THE INVENTION

Accordingly, it is an advantage of the present invention that a catalytic converter and method for manufacture thereof is provided.

It is another advantage of the present invention that a method of manufacture of a catalytic converter is provided that eliminates the need for rolled seams while maintaining a gas-tight join in the fabrication of a converter shell.

It is another advantage of the present invention that a method of manufacture of a catalytic converter is provided that in one embodiment utilizes an Nd:YAG laser to create gas-tight joins in a final assembly.

It is another advantage of the present invention that a method of manufacture of a catalytic converter is provided in which no butt-welds exists.

The above and other advantages of the present invention are carried out in one form by a method for the manufacture of a catalytic converter incorporating fabricating a shell for the catalytic converter, loading a catalytic substrate into the shell, assembling an endcone for the catalytic converter, and laser welding the endcone to the shell.

The above and other advantages of the present invention are carried out in another form by a catalytic converter made up of a shell, a ceramic catalytic substrate loaded into the shell, an endcone fit to the shell, and a bead formed by laser welding the endcone to the shell.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
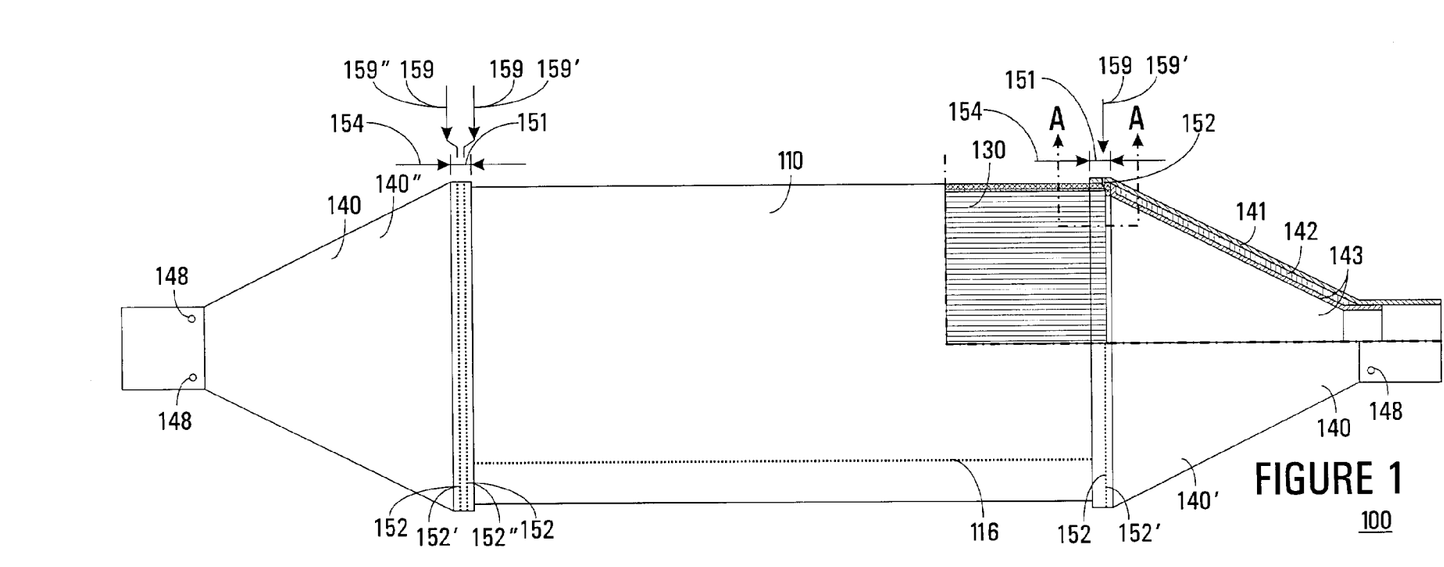
FIG. 1 shows a side view of a laser-welded cone-shell catalytic converter with one corner cut away to depict internal components in accordance with a preferred embodiment of the present invention.
Figure 2:
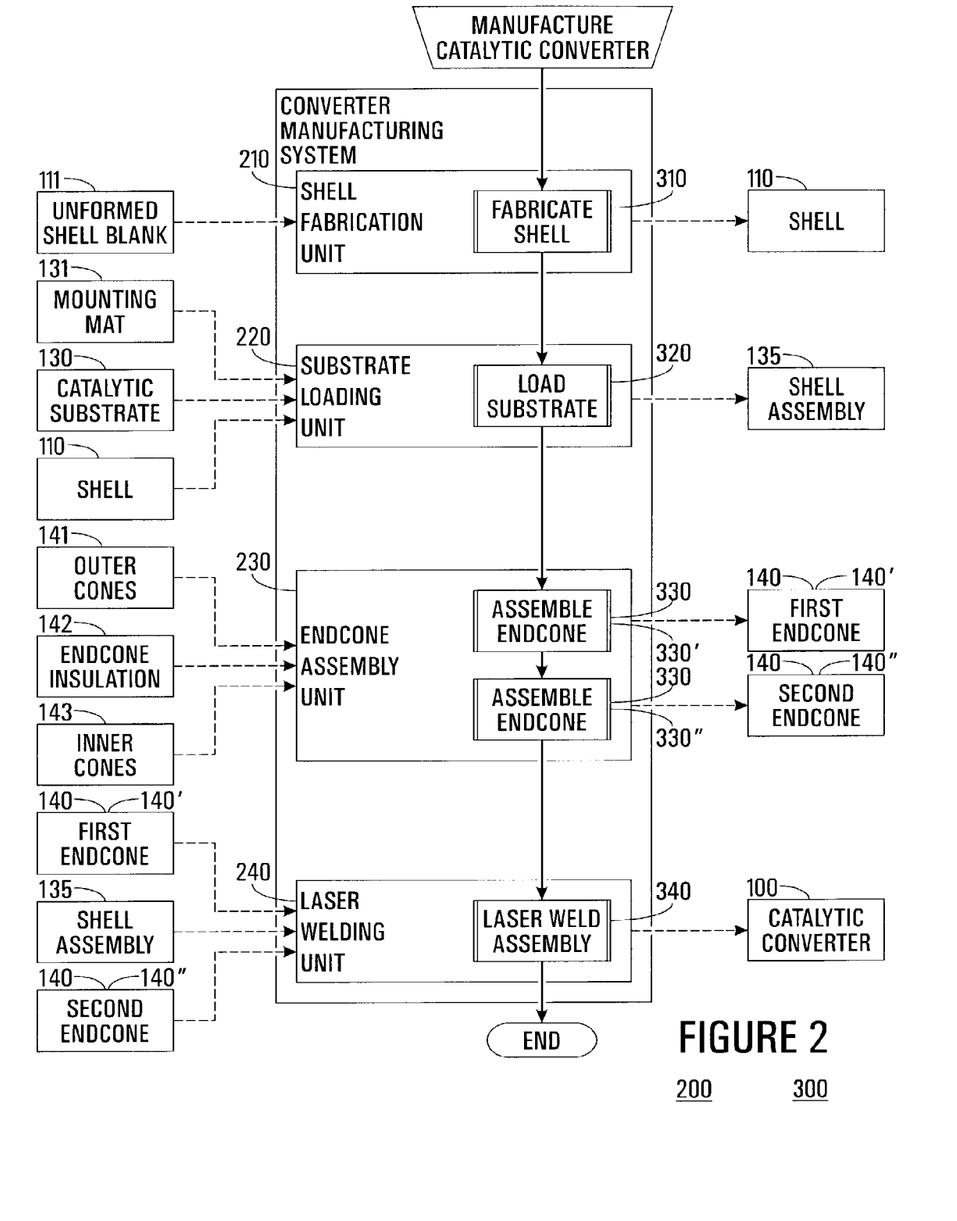
FIG. 2 shows a block diagram depicting a system for the manufacture of the laser-welded cone-shell catalytic converter of FIG. 1, and a flowchart depicting a process by which the catalytic converter may be manufactured in accordance with an alternative preferred embodiment of the present invention.

FIG. 1 shows a side view of a laser-welded cone-shell catalytic converter 100 with one corner cut away to depict internal components thereof. FIG. 2 shows a block diagram depicting a system 200 for the manufacture of catalytic converter 100, and a flowchart depicting a process 300 by which catalytic converter 100 may be manufactured by system 200 in accordance with a preferred embodiment of the present invention.

For purposes of clarity, a reference number assigned to an item identifies that same item throughout this discussion and in all relevant Figures. Catalytic converter 100 and all components thereof are assigned reference numbers between 100 and 199, inclusively. Similarly, catalytic-converter manufacturing system 200 and all components thereof are assigned reference numbers between 200 and 299, inclusively. Likewise, catalytic-converter manufacturing process 300 and all subprocesses and tasks thereof are assigned reference numbers between 300 and 399, inclusively.

System 200 is configured to effect process 300 to manufacture catalytic converter 100. There exists a direct relationship between the components of system 200 and the subprocess and tasks of process 300. For this reason, FIGS. 2, 3, 9, 11, and 13 (discussed in detail hereinafter) depict simultaneously block diagrams of components of system 200 and flow charts of subprocesses and tasks of process 300.

Those skilled in the art will appreciate that system 200 is configured to effect process 300 and produce catalytic converter 100. System 200 exists, in the spirit of the present invention, whether or not system 200 is actively effecting process 200 at any given time. For the sake of simplicity, this discussion will assume that system 200 is actively effecting process 300 and that catalytic converter 100 is undergoing manufacture.

Figure 3:
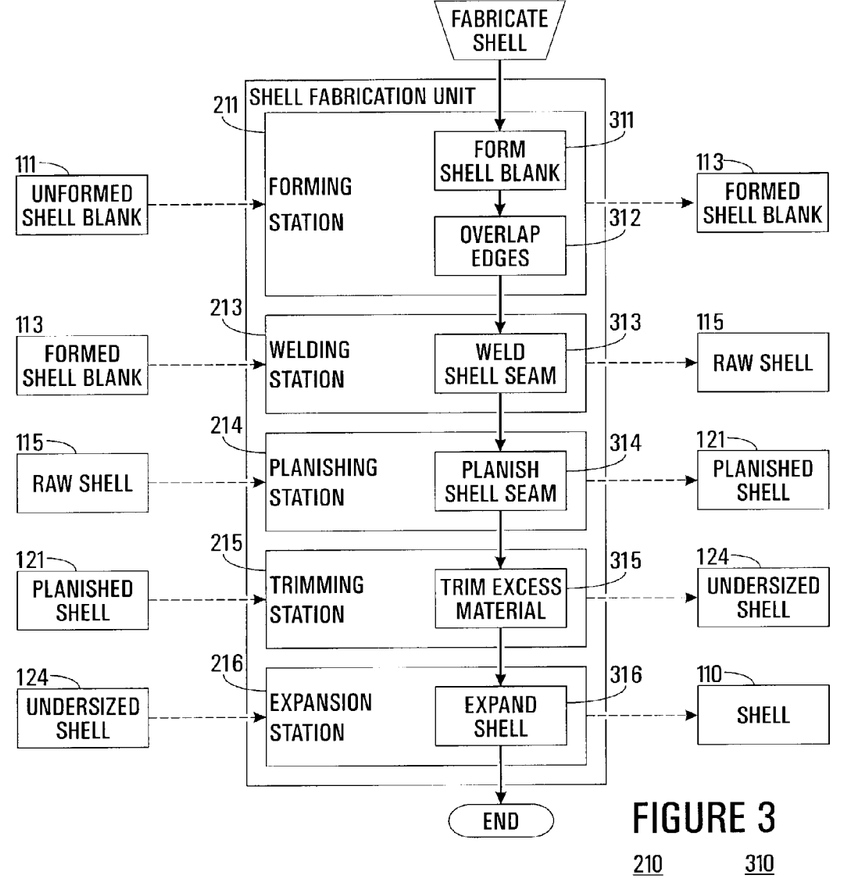
FIG. 3 shows a block diagram depicting a shell fabrication unit of the system of FIG. 2, and a flowchart depicting a subprocess by which a shell may be fabricated in accordance with a preferred embodiment of the present invention.
Figures 4, 8, 10:
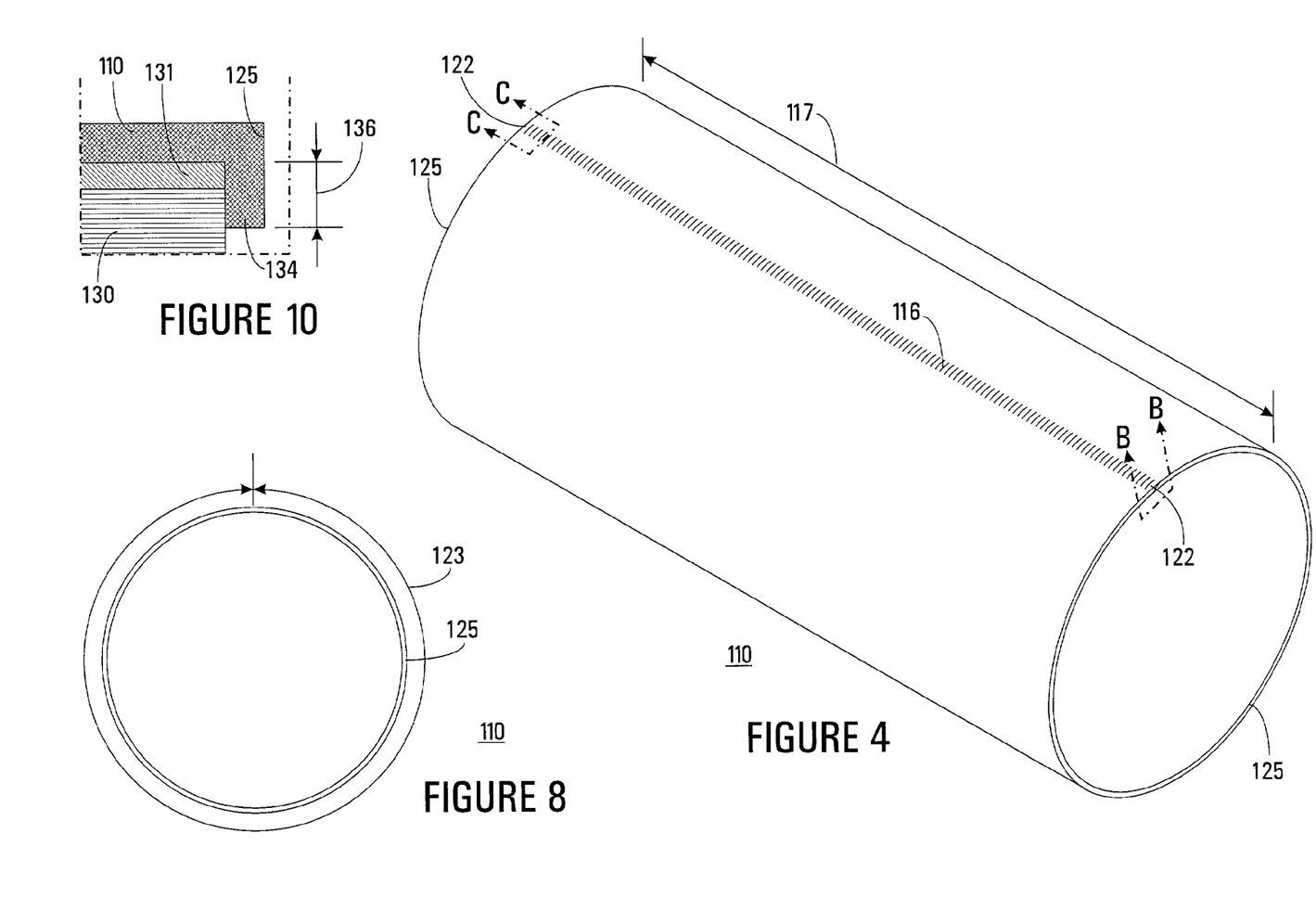
FIG. 4 shows an isometric view of a shell for the catalytic converter of FIG. 1 as fabricated by the subprocess of FIG. 3 in accordance with a preferred embodiment of the present invention.
FIG. 8 shows an end view of the shell of FIG. 4 depicting a perimeter thereof in accordance with a preferred embodiment of the present invention.
FIG. 10 shows a cross-sectional side view of a detail A—A of the converter of FIG. 1 depicting a shell into which a substrate has been inserted in accordance with a preferred embodiment of the present invention.

FIG. 3 shows a block diagram depicting a shell-fabrication unit 210 of system 200, and a flowchart depicting a subprocess 310 by which a shell 110 for catalytic converter 100 may be fabricated. FIG. 4 shows an isometric view of shell 110 as fabricated by subprocess 310 in accordance with a preferred embodiment of the present invention. The following discussion refers to FIGS. 1, 2, 3, and 4.

In the preferred embodiment, system 200 contains primary units effecting primary subprocesses of process 300. One such primary unit is shell-fabrication unit 210, which effects subprocess 310 to fabricate shell 110. A forming station 211 of shell-fabrication unit 210 effects a task 311 to form an unformed shell blank 111 into a cylindroid. Unformed shell blank 111 is initially flat sheet metal (not shown). Task 311 may form unformed shell blank 111 by bending unformed shell blank 111 over a mandrel (not shown) or by other means well known to those skilled in the art.

Figure 5:
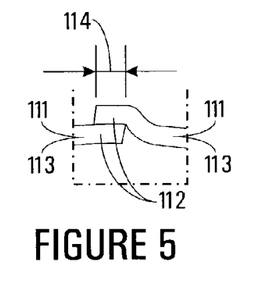
FIG. 5 shows an end view of a detail B—B of the shell of FIG. 4 depicting an overlapping of ends of an unformed shell blank prior to welding in accordance with a preferred embodiment of the present invention.

FIG. 5 shows an end view of a detail B—B (FIG. 4) of shell 110 depicting an overlapping of edges 112 of unformed shell blank 111 prior to welding in accordance with a preferred embodiment of the present invention. The following discussion refers to FIGS. 1, 2, 3, 4, and 5.

During task 311, forming station 211 effects a task 312 to overlap edges 112 of unformed shell blank 111. Tasks 311 and 312 result in unformed shell blank 111 being formed into a formed shell blank 113 having a lap zone 114 where edges 112 overlap.

A welding station 213 of shell-fabrication unit 210 effects a task 313 to weld edges 112 of formed shell blank 113 in lap zone 114. This produces a raw shell 115 having a shell seam 116 extending over a full length 117 of shell 110.

In the preferred embodiment, welding station 213 is a resistance-welding station 213 and task 313 resistance welds edges 112. Desirably, raw shell 115 is formed over a mandrel (not shown) serving as one pole of a resistance welder. A wheel serving as the other pole of the resistance welder is rolled over edges 112 the full length 117 of raw shell 115. In this manner, shell seam 116 may be formed as a strong, gas-tight, lap-joint seam.

Figure 6:
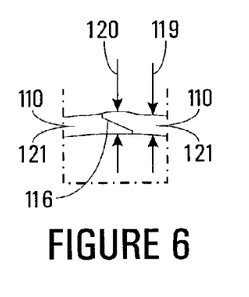
FIG. 6 shows an end view of the detail B—B of the shell of FIG. 4 depicting an overlapping of ends of a formed shell blank after welding and planishing in accordance with a preferred embodiment of the present invention.

FIG. 6 shows an end view of detail B—B (FIG. 4) of shell 110 after welding and planishing of shell seam 116, and FIG.

7 shows a surface view of a detail C—C (FIG. 4) of shell 110 depicting excess material 118 forced out of shell seam 116 during planishing in accordance with a preferred embodiment of the present invention. The following discussion refers to FIGS. 1, 2, 3, 4, and 6.

Figure 7:
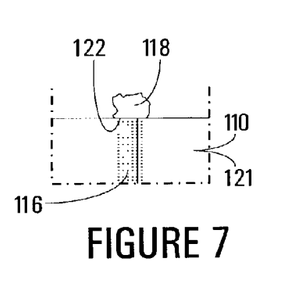
FIG. 7 shows a surface view of a detail C—C of the shell of FIG. 4 depicting excess material forced out of a shell seam during planishing thereof in accordance with a preferred embodiment of the present invention.

On raw shell 115, shell seam 116 is unfinished. That is, shell seam 116 has not yet achieved its final condition. A planishing station 214 of shell-fabrication unit 210 effects a task 314 to planish shell seam 116 and produce a planished shell 121.

Shell 110 (i.e., unformed shell blank 111) has a shell thickness 119. In planishing task 314, shell seam 116 is planished to a seam thickness 120 not less than shell thickness 119 and not greater than 125 percent of shell thickness 119. Preferably, seam thickness 120 is substantially 115 percent of shell thickness 119. This results in shell seam 116 becoming a smooth join only slightly thicker than the surrounding material of shell 110. This contributes significantly when shell 110 is fitted to other components of catalytic converter 100 (discussed hereinbelow).

As shell seam 116 is planished by task 314, excess material 118 is forced out the ends 122 of shell seam 116. A trimming station 215 of shell-fabrication unit 210 effects a task 315 to trim excess material 118 from ends 122 of shell seam 116. Shell seam 116 has now attained a finished condition.

FIG. 8 shows an end view of shell 110 depicting a perimeter 123 thereof in accordance with a preferred embodiment of the present invention. The following discussion refers to FIGS. 1, 2, 3, 4, and 8.

In the preferred embodiment, tasks 311, 312, 313, 314, and 315 produce an undersized shell 124. That is, shell 110 is intentionally fabricated slightly undersized. Shell 110, when finished, is a cylindroid (typically a circular, oval, or elliptical cylinder, though this is not a requirement of the present invention) having a predetermined perimeter 123 when viewed from a shell end 125. Undersized shell 124 has a perimeter (not shown) slightly smaller than predetermined perimeter 123.

An expansion station 216 of shell-fabrication unit 210 effects a task 316 to expand undersized shell 124 until the perimeter thereof is substantially equal to desired predetermined perimeter 123. By producing then expanding undersized shell 124, shell 110 may more accurately be fabricated having the desired shape and size than were expansion task 316 to be eliminated.

This completes subprocess 310 of process 300 and the fabrication of shell 110 by shell-fabrication unit 210 of system 200

Figure 9:
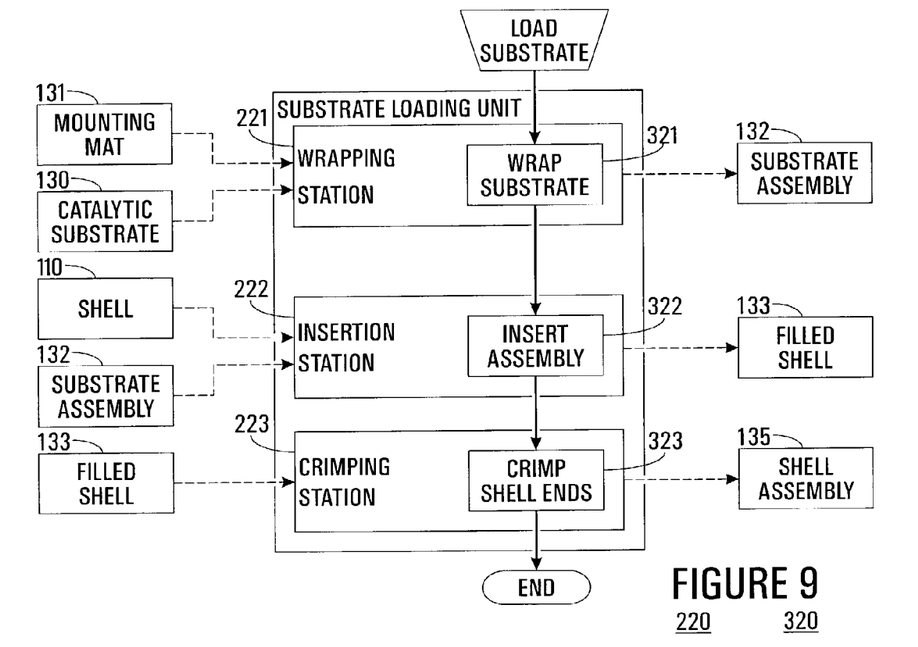
FIG. 9 shows a block diagram depicting a shell loading unit of the system of FIG. 2, and a flowchart depicting a subprocess by which the shell may be loaded in accordance with a preferred embodiment of the present invention.

FIG. 9 shows a block diagram depicting a substrate-loading unit 220 of system 200, and a flowchart depicting a subprocess 320 by which shell 110 may be loaded with a catalytic substrate 130, and FIG. 10 shows a cross-sectional side view of a detail A—A (FIG. 1) of catalytic converter 100 depicting shell 110 into which catalytic substrate 130 has been inserted in accordance with a preferred embodiment of the present invention. The following discussion refers to FIGS. 1, 2, 9, and 10.

Another primary unit of system 200 is substrate-loading unit 220 which effects subprocess 320 to load shell 110, fabricated in subprocess 310, with catalytic substrate 130. In the preferred embodiment, a wrapping station 221 of substrate-loading unit 220 effects a task 321 to wrap platinum/palladium-clad ceramic catalytic substrate 130 with a ceramic-fiber mounting mat 131 to form a substrate assembly 132.

Those skilled in the art will appreciate that while catalytic substrate 130, as discussed herein, is made up of at least one catalytic substrate, standard modular manufacturing techniques may, in some cases, necessitate the use of a plurality of catalytic substrates, i.e., catalytic-substrate "modules," to form a single catalytic substrate 130. The use of a plurality of catalytic substrates to form catalytic substrate 130 does not depart from the spirit of the present invention.

An insertion station 222 of substrate-loading unit 220 effects a task 322 to insert substrate assembly 132 into shell 110 to form a filled shell 133.

A crimping station 223 of substrate-loading unit 220 then effects a task 323 to crimp ends 125 of shell 110 to form a turndown 134 and produce a shell assembly 135. In the preferred embodiment, turndown 134 has a turndown depth 136 of 1.0±0.4 mm. Desirably, turndown depth 136 is substantially equal to 1.0 mm. Turndown 134 serves the dual purpose of retaining substrate assembly 132 within shell assembly 135 (i.e., within filled shell 133) and of acting as a chamfer to aid in the fitting of components of catalytic converter 100 together (discussed hereinafter).

This completes subprocess 320 of process 300 and the loading of shell 110 with catalytic substrate 130 by substrate-loading unit 220 of system 200.

Figure 11:
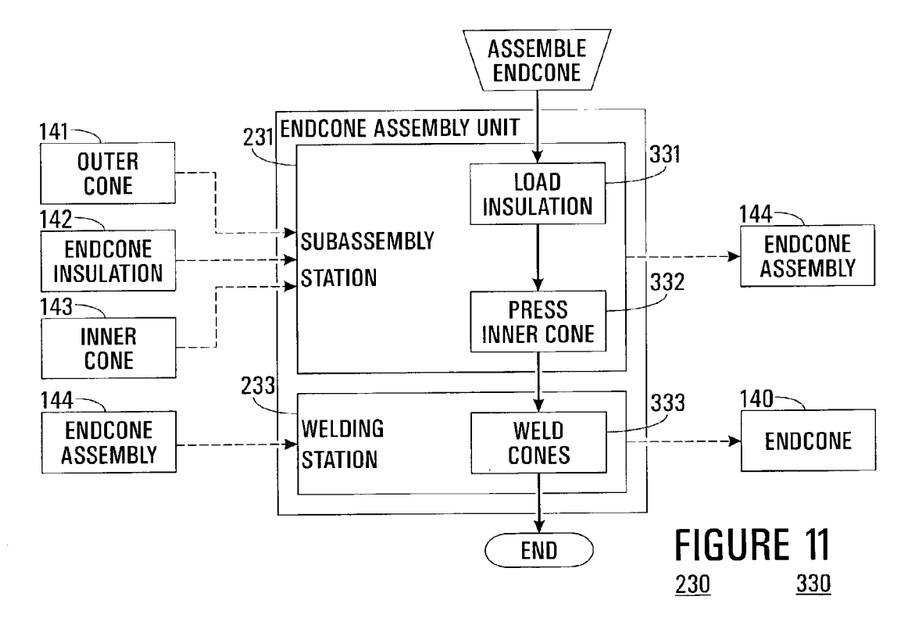
FIG. 11 shows a block diagram depicting an endcone assembly unit of the system of FIG. 2, and a flowchart depicting a subprocess by which an endcone may be assembled in accordance with a preferred embodiment of the present invention.
Figure 12:
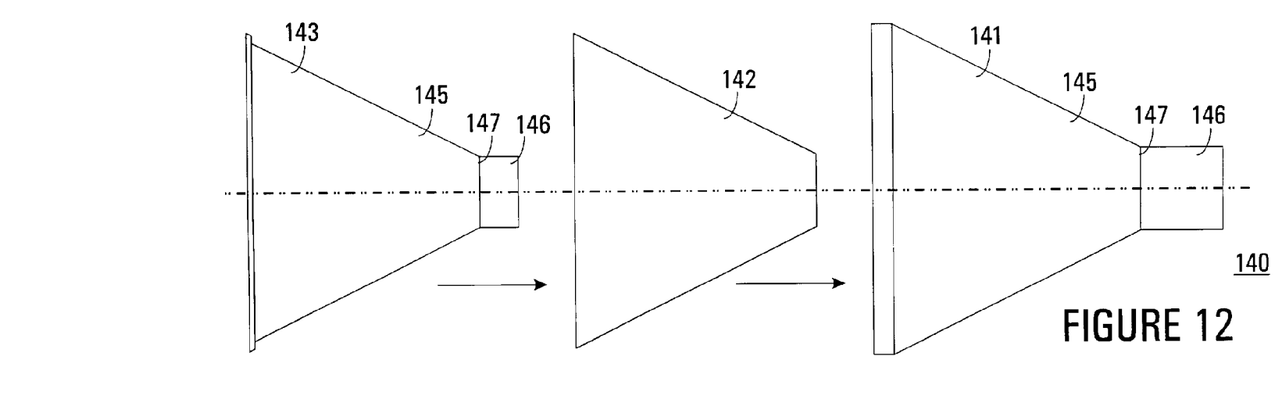
FIG. 12 shows an exploded side view of the components of an endcone for the catalytic converter of FIG. 1 as fabricated by the subprocess of FIG. 11 in accordance with a preferred embodiment of the present invention.

FIG. 11 shows a block diagram depicting an endcone-assembly unit 230 of system 200, and a flowchart depicting a subprocess 330 by which an endcone 140 may be assembled, and FIG. 12 shows an exploded side view of the components of endcone 140 for catalytic converter 100 as fabricated by subprocess 330 in accordance with a preferred embodiment of the present invention. The following discussion refers to FIGS. 1, 2, 11, and 12.

Another primary unit of system 200 is endcone-assembly unit 230, which effects subprocess 330 to assemble endcones 140 of catalytic converter 100. A subassembly station 231 of endcone-assembly unit 230 effects a task 331 to load an outer cone 141 with endcone insulation 142, and then to effect a task 332 to press an inner cone 143 into outer cone 141. Endcone 140, therefore, becomes an endcone assembly 144 where a molded ceramic fiber material serving as endcone insulation 142 is sandwiched between outer and inner cones 141 and 143.

A welding station 233 of endcone-assembly unit 230 effects a task 333 to weld outer and inner cones 141 and 143, thereby forming endcone 140. Each of outer and inner cones 141 and 143 is formed of a hollow frustum 145, with a cylindroid neck 146 coupled to a smaller end 147 of hollow frustum 145. In the preferred embodiment, task 333 welds cylindroid necks 146 of outer and inner cones 141 and 143 together. Since a gas-tight join is not required between outer and inner cones 141 and 143, task 333 may spot-weld necks 146 for economy and efficiency, i.e., welding station 233 may be a spot-welding station 233. Desirably, at least four spot-welds 148 are formed per neck 146.

Catalytic converter 100 normally requires two endcones 140. For this reason, endcone-assembly unit 230 effects a first subprocess 330 (330') to assemble a first endcone 140 (140'), and a second subprocess 330 (330") to assemble a second endcone 140 (140"). Those skilled in the art will appreciate that endcones 140' and 140" need not be identical, as determined by the design of catalytic converter 100. The use of dissimilar endcones 140 does not depart from the spirit of the present invention.

This completes subprocesses 330' and 330" of process 300 and the assembly of endcones 140' and 140" by endcone-assembly unit 230 of system 200.

Figure 13:
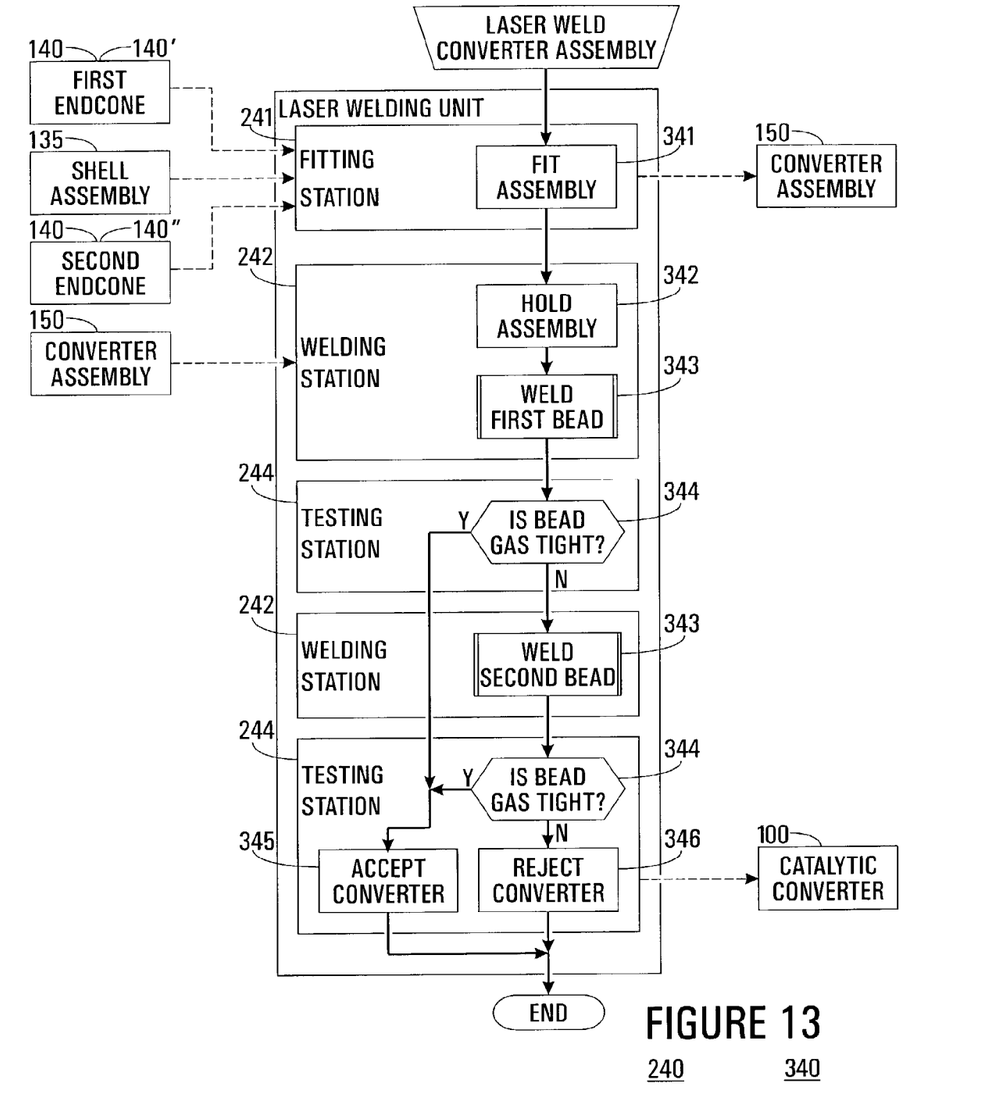
FIG. 13 shows a block diagram depicting a laser-welding unit of the system of FIG. 2, and a flowchart depicting a subprocess by which a catalytic converter assembly may be welded in accordance with a preferred embodiment of the present invention.
Figure 14:
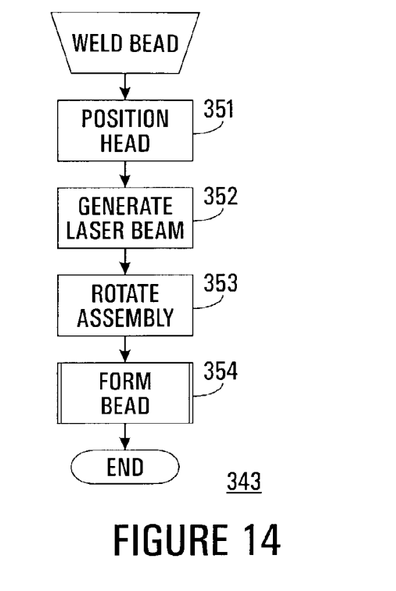
FIG. 14 shows a flowchart depicting a subprocess for the welding of a bead by a laser welder in accordance with a preferred embodiment of the present invention.
Figure 15:
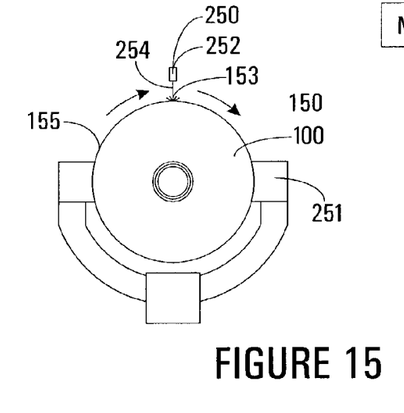
FIG. 15 shows an end view of a catalytic converter clamped into and being rotated by an assembly holder during laser welding thereof in accordance with a preferred embodiment of the present invention.
Figure 16:
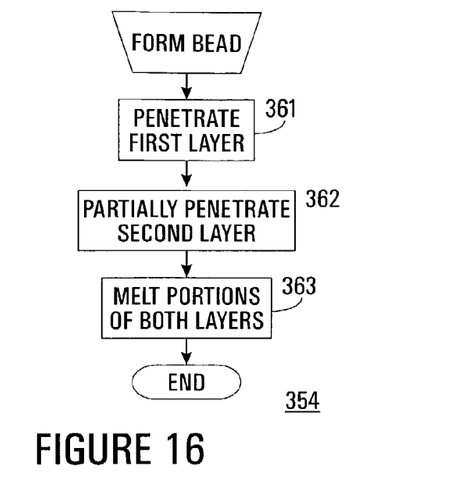
FIG. 16 shows a flowchart depicting a subprocess for the production of a molten spot during the formation of a bead by laser welding in accordance with a preferred embodiment of the present invention.
Figure 17:
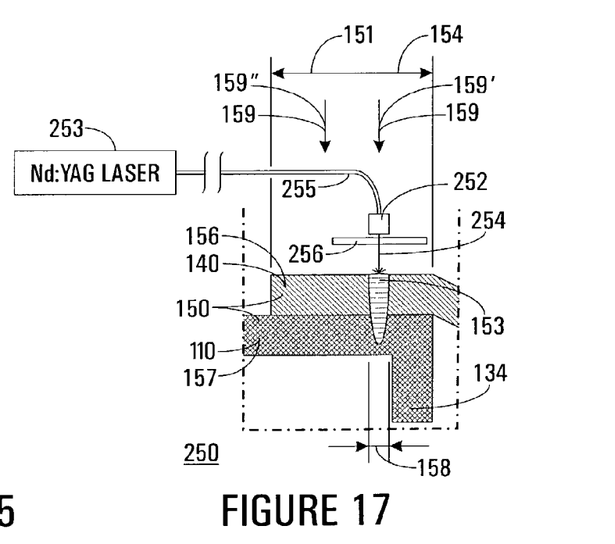
FIG. 17 shows a cross-sectional side view of the detail A—A of the converter of FIG. 1 depicting a portion of a bead during the laser welding thereof with associated welding head components in accordance with a preferred embodiment of the present invention.

FIG. 13 shows a block diagram depicting a laser-welding unit 240 of system 200, and a flowchart depicting a subprocess 340 by which a converter assembly 150 may be welded. FIG. 14 shows a flowchart depicting a subprocess 343 for the welding of a bead 152 by a laser welder 250. FIG. 15 shows an end view of converter assembly 150 clamped into and being rotated by an assembly holder 251 of laser welder 250 during laser welding of bead 152. FIG. 16 shows a flowchart depicting a subprocess 354 for the production of a molten spot 153 during the welding of bead 152. FIG. 17 shows a cross-sectional side view of a detail A—A from FIG. 1 of catalytic converter 100 depicting a portion of bead 152 during the laser welding thereof with an associated laser-welding head 252 and other components in accordance with a preferred embodiment of the present invention. The following discussion refers to FIGS. 1, 2, 13, 14, 15, 16, and 17.

A fourth primary unit of system 200 is laser-welding unit 240 which effects subprocess 340 to laser weld components of catalytic converter 100 together. A fitting station 241 of laser-welding unit 240 effects a task 341 to fit first endcone 140', shell assembly 135, and second endcone 140" together to form converter assembly 150.

During fitting task 341, endcones 140 are pressed onto shell 110. During shell-fabrication subprocess 310 (discussed hereinbefore) shell seam 116 was planished in a task 314 to a seam thickness 120 of desirably 115 percent of shell thickness 119. This means that, at shell seam 116, the wall of shell 110 is only 15 percent greater than at all other locations. This small difference allows endcones 140 to be pressed onto shell 110 with substantially negligible distortion.

In the Figures, endcones 140 are shown as being fitted onto (i.e., over) shell 110. Those skilled in the art will appreciate that this is not a requirement of the present invention, and endcones 140 may be fitted into shell 110 without departing from the spirit of the present invention.

When endcone 140 is fitted onto shell 110, turndown 134 may serve as a chamfer guiding endcone 140 into position, though this is not a requirement of the present invention.

When endcone 140 is fitted either onto or into shell 110, cylindroid overlap zone 151 is formed. Overlap zone 151 has a zone width 154 extending entirely around catalytic converter 100 as a zone perimeter 155. Within overlap zone 151, whichever one of endcone 140 or shell 110 is on the outside forms a first layer 156, and whichever one of endcone 140 or shell 110 is on the inside forms a second layer 157.

A laser-welding station 242 of laser-welding unit 240 effects a task 342 to hold converter assembly 150 in position using assembly holder 251, and to then effect subprocess 343 to weld bead 152 within overlap zone 151, thereby joining first and second layers 156 and 157.

Bead 152 has a bead width 158, which is less than zone width 154. In the preferred embodiment, bead width 158 is no greater than and desirably less than 50 percent of zone width 154. This allows more than one bead 152 to be placed within overlap zone 151 (discussed hereinafter).

In a task 351 within subprocess 343, laser-welding head 252 is positioned to enable the welding of bead 152 at a bead position 159 within overlap zone 151, and maintained at that position throughout the welding of bead 152.

While task 351 maintains laser-welding head 252 in the appropriate position, a laser 253 generates a laser beam 254 in a task 352, and assembly holder 251 rotates converter assembly 150 in a task 353.

In subprocess 354, effected in response to tasks 351, 352, and 353, bead 152 is formed at bead position 159. Within subprocess 354, laser beam 254 penetrates 100 percent of first layer 156 in a task 361, and penetrates at least 40 percent and no more than 95 percent of second layer 157 in a task 362. In the preferred embodiment, laser beam 254 penetrates substantially 75 percent of second layer 157.

By penetrating substantially 75 percent of second layer 157, laser beam 254 penetrates second layer 157 deeply enough to create a strong bead 152 even when first layer 156 suffers minor distortions. This may be exemplified when first layer 156 is endcone 140 and second layer 157 is shell 110, and endcone 140 passes over shell seam 116.

As a direct result of tasks 361 and 362, portions of first and second layers 156 and 157, i.e., those portions penetrated by laser beam 254, are melted to form molten spot 153 in a task 363. Those skilled in the art will appreciate that molten spot 153 is molten only so long as laser beam 254 is present. Since converter assembly 150 is being rotated by assembly holder 251, those portions of first and second layers 156 and 157 being penetrated by laser beam 254 are continuously changing. The result is that molten spot 153 effectively progresses around zone perimeter 155 in response to the rotation of converter assembly 150 and bead 152 is formed. As laser beam 254 leaves a specific point on zone perimeter 155 in response to the rotation, molten spot 153 at that specific point solidifies. It is this continuous formation and solidification of molten spot 153 that forms bead 152.

Additionally, in the preferred embodiment, assembly holder 251 and welding head 252 are oriented so as to project laser beam 254 substantially vertically downward onto overlap zone 151 of converter assembly 150. Laser beam 254 therefore creates molten spot 153 at an uppermost point (zone top) 160 of zone perimeter 155. As converter assembly 150 rotates, molten spot 153 remains at zone top 160. This results in the retention of the melted portions first and second layers 156 and 157 within molten spot 153. This in turn results in the formation of a smooth and strong bead 152 as converter assembly 150 rotates.

Once bead 152 has been formed, a testing station 244 of laser-welding unit 240 effects a query task 344 to determine if bead.152 is gas tight, i.e., if bead 152 forms a gas-tight seal between endcone 140 and shell 110.

If query task 344 determines that bead 152 forms a gas-tight seal between endcone 140 and shell 110, then in a task 345 shell 110 is accepted because bead 152 is good.

If query task 344 determines that bead 152 does not form a gas-tight seal between endcone 140 and shell 110, then bead 152 has not been properly formed. In this case, bead 152 becomes a first bead 152', bead position 159 becomes a first bead position 159', and laser-welding station 242 effects subprocess 343 a second time to weld a second bead 152" at a second bead position 159". Subprocess 343 welds second bead 152" substantially exactly as it welded first bead 152' (discussed hereinbefore), save that in task 351 laser-welding head 252 is positioned to enable the welding of second bead 152" at second bead position 159" within overlap zone 151.

Following subprocess 343, testing station 244 again effects query task 344 to determine if second bead 152" forms a gas-tight seal between endcone 140 and shell 110.

If query task 344 determines that second bead 152" forms a gas-tight seal between endcone 140 and shell 110, then in task 345 shell 110 is accepted because second bead 152" is good, even though first bead 152' is bad.

If query task 344 determines that second bead 152" does not form a gas-tight seal between endcone 140 and shell 110, then in a task 346 catalytic converter 100 is rejected because both first and second beads 152' and 152" are bad.

Those skilled in the art will appreciate that catalytic converter 100 has two endcones 140 which are joined to a single shell 110. Therefore, laser-welding unit 240 effects subprocess 340 twice, once to weld first endcone 140' to shell 110, and once to weld second endcone 140" to shell 110. It will be obvious that these two welding activities may be effected sequentially or simultaneously. When effected sequentially, then the entirety of subprocess 340 is repeated for each of first and second endcones 140' and 140".

When effected simultaneously, then laser-welding station 242 contains two laser-welding heads 252 configured to be independently positioned for each of first and second endcones 140' and 140", an to substantially simultaneously weld two beads 152. The mechanics of such simultaneous activity are conventional and well known to those skilled in the art.

Once the laser weld between first endcone 140' and shell 110 and the laser weld between second endcone 140" and shell 110 have both been accepted, catalytic converter 100 is deemed finished and process 300 is complete.

Laser 253 is of a type suitable to penetrate the material(s) of which endcones 140 and shell 110 are made. This is typically sheet steel and/or aluminum. In the preferred embodiment, therefore, laser 253 is a neodymium-yttrium-aluminum-garnet (Nd:YAG) laser.

Laser welding generates heat. The excessive generation of heat during the welding of converter assembly 150 may induce thermal stresses that may potentially damage ceramic catalytic substrate 130. Laser 253 therefore desirably has sufficient power to penetrate first layer 156 and substantially 75 percent of second layer 157 quickly enough to limit heat buildup. In the preferred embodiment, laser 253 is a 2.0 kW Nd:YAG laser. This provides sufficient power to form bead 152 while converter assembly 150 rotates without producing excessive heat at any give point on zone periphery 155.

Also in the preferred embodiment, laser 253 is coupled to laser-welding head(s) 252 by a fiber-optic coupler(s) (i.e., a "light pipe") 255. This allows laser 253 to be removed from laser-welding station 242 and isolated from vibrations thereof.

Well known to those skilled in the art is the splattering of material or splatter (not shown) from molten spot 153 during welding. This splatter poses a hazard to laser-welding head 252, which may contain lenses and/or other precision components. Splatter also poses a hazard to operating personnel. Therefore, while not a requirement of the present invention, the preferred embodiment of laser-welding station 242 desirably incorporates a sacrificial splatter shield 256 of thermal-tolerant glass or quartz to prevent splatter from reaching laser-welding head 252 or any personnel.

While not shown, laser-welding station 242 may also contain an "air knife" to isolate molten spot 153 from the surrounding atmosphere during welding. The air-knife consists of a gas (often nitrogen) blown across molten spot 153. By bathing molten spot 153 with this gas, oxidization may be inhibited.

Those skilled in the art will appreciate that the subprocesses and tasks of process 300 need not be effected in the strict sequence described herein. For example, the assembly of endcones 140 by subprocess 330 may be effected in advance of the fabrication of shell 110 by subprocess 310. Likewise, the fabrication of any number (i.e., a batch) of shells 110 by subprocess 310 may be effect before any single shell 110 within that batch of shells 110 is loaded with catalytic substrates 130.

Those skilled in the art will also appreciate that there is no requirement in the present invention that all subprocesses and tasks thereof, and by extension all units and stations configured to effect those subprocesses and tasks, be proximate. For example, shell-fabrication unit 210 may effect subprocess 310 to fabricate shells 110 in one building or factory, while endcone-assembly unit 230 may effect subprocess 330 to load shells 110 with catalytic substrates 130 in a different building of factory.

In summary, the present invention teaches a system 200 and a process 300 for the manufacture of a catalytic converter 100. System 200 and process 300 eliminate the need for rolled seams while maintaining a gas-tight join (shell seam 116) in the fabrication of a shell 110 for catalytic converter 100. System 200 and process 300 utilizes an Nd:YAG laser 253 to create gas-tight joins (beads 152) in final assembly of a catalytic converter 100. System 200 and process 300 produce catalytic converter 100 free of butt-weld joins.

Although the preferred embodiments of the invention have been illustrated and described in detail, it will be readily apparent to those skilled in the art that various modifications may be made therein without departing from the spirit of the invention or from the scope of the appended claims.

What is claimed is:

1. A method for the manufacture of a catalytic converter, said method comprising:
   fabricating a shell for said catalytic converter;
   loading a catalytic substrate into said shell;
   assembling an endcone for said catalytic converter; and
   laser welding said endcone to said shell using a laser beam, said laser welding activity including:
      welding a first bead between said endcone and said shell;
      testing said first bead to ascertain if said first bead produces a gas-tight seal between said endcone and said shell; and
      welding, when said testing activity ascertains said first bead does not produce said gas-tight seal, a second bead between said endcone and said shell.

2. A method as claimed in claim 1 wherein said fabricating activity comprises:
   forming an unformed shell blank into a cylindroid;
   overlapping edges of said unformed shell blank during said forming activity; and
   welding said edges so as to produce a shell having a gas-tight shell seam over a length of said shell.

3. A method as claimed in claim 2 wherein said unformed shell blank has a shell thickness, and wherein said fabricating activity additionally comprises planishing said shell seam to a seam thickness greater than said shell thickness and less than 125 percent of said shell thickness.

4. A method as claimed in claim 1 wherein said loading activity comprises:
   inserting said catalytic substrate into said shell; and
   crimping an end of said shell to form a turndown.

5. A method as claimed in claim 4 wherein said loading activity additionally comprises wrapping said catalytic substrate within a mounting mat prior to said inserting activity.

6. A method as claimed in claim 1 wherein said assembling activity comprises:
   loading said outer cone with an endcone insulation;
   pressing an inner cone into said outer cone; and
   welding activity said inner cone to said outer cone to form said endcone.

7. A method as claimed in claim 1 wherein said laser-welding activity comprises generating said laser beam with a neodymium-yttrium-aluminum-garnet laser.

8. A method as claimed in claim 1 wherein said endcone is a first endcone, said laser beam is a first laser beam, and wherein said method comprises:
fabricating said shell;
loading said catalytic substrate into said shell;
assembling said first endcone;
assembling a second endcone; and
laser welding said first and second endcones to said shell using said first laser beam and a second laser beam, respectively.

9. A method for the manufacture of a catalytic converter, said method comprising:
fabricating a shell for said catalytic converter, said fabricating including:
forming an unformed shell blank into a cylindroid, said unformed shell blank having a shell thickness;
overlapping edges of said unformed shell blank during said forming activity;
welding said edges so as to produce a shell having a gas-tight shell seam over a length of said shell;
planishing said shell seam to a seam thickness greater than said shell thickness and less than 125 percent of said shell thickness, said planishing activity producing excess material at an end of said shell seam; and
trimming said excess material from said end of said shell seam;
loading a catalytic substrate into said shell;
assembling an endcone for said catalytic converter; and
laser welding said endcone to said shell using a laser beam.

10. A method for the manufacture of a catalytic converter, said method comprising:
fabricating a shell for said catalytic converter, said fabricating activity including:
forming an unformed shell blank into a cylindroid;
overlapping edges of said unformed shell blank during said forming activity;
welding said edges so as to produce a shell having a gas-tight shell seam over a length of said shell, and after said welding activity, an end of said shell has a perimeter less than a predetermined perimeter; and
expanding said shell until said perimeter attains said predetermined perimeter;
loading a catalytic substrate into said shell;
assembling an endcone for said catalytic converter; and
laser welding said endcone to said shell using a laser beam.

11. A method for the manufacture of a catalytic converter, said method comprising:
fabricating a shell for said catalytic converter;
loading a catalytic substrate into said shell;
assembling an endcone for said catalytic converter; and
laser welding said endcone to said shell using a laser beam, said laser-welding activity including:
fitting said endcone to said shell to form a cylindroid overlap zone having a zone width and a zone perimeter; and
welding a bead between said endcone and said shell in said cylindroid overlap zone, extending around said zone perimeter, and having a bead width less than said zone width, wherein a first one of said endcone and said shell constitutes a first layer, a second one of said endcone and said shell constitutes a second layer, and said welding activity comprises:
a) penetrating 100 percent of said first layer with said laser beam; and
b) penetrating at between 40 and 95 percent of said second layer with said laser beam.

12. A method as claimed in claim 11 wherein said penetrating activity b) penetrates substantially 75 percent of said second layer with said laser beam.

13. A method for the manufacture of a laser-welded cone-shell catalytic converter, said method comprising:
forming an unformed shell blank into a cylindroid;
overlapping edges of said unformed shell blank during said forming activity;
resistance welding said edges so as to produce a shell having a shell seam over a length of said shell;
planishing said shell seam to a thickness greater than and less than 125 percent of a thickness of said unformed shell blank;
wrapping a ceramic catalytic substrate within a ceramic fiber mounting mat;
inserting said ceramic catalytic substrate into said shell;
crimping an end of said shell to form a turndown having a depth of 1.0±0.4 mm;
loading an outer cone with an endcone insulation;
pressing an inner cone into said outer cone;
spot-welding said inner cone and said outer cone to form an endcone of said catalytic converter;
fitting said endcone to said shell so as to form an overlap zone; and
laser welding said endcone to said shell within said overlap zone using a laser beam generated by a neodymium-yttrium-aluminum-garnet laser.

* * * * *